US007962393B2

(12) United States Patent
Greenbaum et al.

(10) Patent No.: US 7,962,393 B2
(45) Date of Patent: Jun. 14, 2011

(54) GLOBAL COMPLIANCE SYSTEM

(75) Inventors: Frederic Greenbaum, Stamford, CT (US); Michael Cortese, London (GB); Waikit Ng, Stamford, CT (US)

(73) Assignee: UBS AG, Zurich (CH)

(*) Notice: Subject to any disclaimer, the term of this patent is extended or adjusted under 35 U.S.C. 154(b) by 0 days.

(21) Appl. No.: 12/582,195

(22) Filed: Oct. 20, 2009

(65) Prior Publication Data

US 2010/0088217 A1 Apr. 8, 2010

Related U.S. Application Data

(63) Continuation of application No. 10/090,285, filed on Mar. 4, 2002, now Pat. No. 7,606,747.

(60) Provisional application No. 60/289,975, filed on May 10, 2001.

(51) Int. Cl.
G06Q 40/00 (2006.01)
(52) U.S. Cl. ............................................. 705/35; 705/37
(58) Field of Classification Search .................... 705/35, 705/37
See application file for complete search history.

(56) References Cited

U.S. PATENT DOCUMENTS

| 5,270,922 | A | 12/1993 | Higgins | 705/37 |
|---|---|---|---|---|
| 5,864,871 | A | 1/1999 | Kitain et al. | 707/104 |
| 5,893,079 | A | 4/1999 | Cwenar | 705/36 |
| 5,978,779 | A | 11/1999 | Stein et al. | 705/37 |
| 6,122,622 | A * | 9/2000 | Wiitala et al. | 705/28 |
| 6,122,635 | A | 9/2000 | Burakoff et al. | 707/102 |
| 6,462,573 | B1 | 10/2002 | McAllister et al. | 324/757 |
| 6,850,970 | B2 | 2/2005 | Littlefield | 709/216 |
| 6,862,573 | B2 * | 3/2005 | Kendall et al. | 705/7 |
| 7,376,615 | B2 * | 5/2008 | Brixius | 705/37 |
| 2002/0059107 | A1 | 5/2002 | Reich et al. | 705/26 |
| 2002/0169774 | A1 * | 11/2002 | Greenbaum et al. | 707/9 |

OTHER PUBLICATIONS

"Insider Trading, Prohibition of Securitied and Exchange Board of India [Prohibition of] Insider Trading) Regulations, 1992" 1992, Section 4.0.*

* cited by examiner

Primary Examiner — Lindsay M. Maguire
(74) Attorney, Agent, or Firm — Proskauer Rose LLP

(57) ABSTRACT

A system for implementing a compliance program in a financial institution is provided and includes a list database for storing material information regarding a plurality of entities that is known to said financial institution. Also included is a list manager that receives a compliance query from an affiliate of the financial institution having a status. The list manager provides a compliance response to the affiliate based on the plurality of entities and according to the status of the affiliate.

19 Claims, 17 Drawing Sheets

Add Transaction - General Information Screen

| General Information | |
|---|---|
| List Type: | Restricted ▼ —203 |
| Business Group: | UBS Warburg ▼ —205 |
| Effective Date: | February ▼  6 ▼  2001 ▼ —207 |
| Transaction Timing: | ▼  13 ▼  37 ▼ —209 |
| Tickler Date: | ▼  ▼  ▼ —211 |
| Off Date: | ▼  ▼  ▼ —213 |
| Responsible Compliance Officer: | MICHAEL CORTESE ▼ —215 |
| Transaction Type: | Advisory - General ▼ —217 |
| Code Name (optional): | —219 |
| Transaction Description: [Max 64 Chars.] | —221 |
| Tickler Comment: | —223 |
| Transaction Summary: | —225 | cancel    next ▸

Add - Restricted List Issuer Detail Screen

Entering restrictions and suppressions for: MICROSOFT CORP

Sales and Training Restrictions — 335

- Restriction Code: RL1 ADVISORY/M&A (non-U.S. registered company) — 303
- Applicable Class: Equity — 305
- Restriction Comments: — 306
- [Max 255 Chars.]

Sales and Training Restrictions — 337

- Forecast: Global — 307
- Rating/Recommendation: Japan — 309
- Safe Harbor: Rule 138: Yes — 311
- Sensitivity High? — 318
- SA Comments: [Max 255 Chars.]
- CO Comments: [Max 255 Chars.]
- Disclaimer Language: [Max 255 Chars.]

- Role: Manager/Co-Manager — 313, 315
- Research Text: US & Japan & Canada — 317
- Safe Harbor: Rule 139: 139A/B — 319, 321, 323

Additional Issuer Information — 339

- Local Code: — 325
- AKA: — 327
- Private Bank: Not Applicable — 329
- Market Maker: ○ No ○ Yes — 331
- Research Coverage: ○ No ○ Yes — 333

301

▸ previous       cancel       ▸ Add New Issuers
                              ▸ Submit Deal

FIG. 3

Add - Deal Team/OTW Personnel Details

Deal Team Information

☐ Click to delete team member  MICHAEL CORTESE

Role: TD — 403
Sector/Product Group: Bank Products/Loan Syndication — 404
Effective on Date: 6 Feb 2001 — 405
Comments: — 406

☐ Click to delete team member  MICHAEL HERDE   Approved by: ROBERT DINERSTEIN

Role: OTW
Sector/Product Group: Business Unit Controller
Effective on Date: 6 Feb 2001
Comments:

▲ Add New Member

◄ previous        cancel        next ►

Entering Research Comments for: CISCO SYSTEMS INC

Grey List Research Comments

Sensitivity High? ☐ —503
SA Comments:
[Max 255 Chars.] ◄▶ —505
CO Comments:
[Max 255 Chars.] ◄▶ —507

Additional Issuer Information

Local Code ⎯509
AKA ⎯511
Market Maker ⊙No ○Yes —513
Research Coverage ⊙No ○Yes —515

Add - Grey List Issuer Detail Screen

◄ previous          cancel          ▲ Add New Issuers
                                    ▲ Submit Deal

Query Results Screen
Global List System

UBS Warburg

- GLS Home
- Add Transaction
- Add/Del/Edit User
- Delete Deal
- Announcements
- Publish Lists
- Control Room Personnel
- GLS Manual Legal & Compliance
- Research Decision Tree
- Restricted List Matrix
- Feedback
- Interchange
- Private Bank

| Txn ID List | | Issuer | | AKA | Transaction | Date On | Date Off |
|---|---|---|---|---|---|---|---|
| 6028 | Radar | XYZ | INDUSTRIES | | Acquisition | Apr 17, 2001 | |
| 14111 | Radar | ABC | SA | | Advisory - General | Oct 15, 2001 | |
| 14195 | Radar | DEF | PLC | | IPO | Oct 22, 2001 | |
| 9828 | Restricted | GHI | INTERNATIONAL | | IPO | Dec 07, 2000 | |
| 14629 | Grey | JKL INC | | | Financing | Nov 23, 2001 | |
| 12821 | Radar | MNO | | | Divestment/Asset Sale | Jul 05, 2001 | |
| 14482 | Grey | PQR | .N.V | | Debt Offering | Nov 12, 2001 | |
| 14563 | Restricted | STU | FUND INC | | Other | Nov 16, 2001 | |
| 13379 | Radar | VWX | | | Other | Aug 23, 2001 | |
| 5229 | Grey | YZ | Bank | | Private Placement | Apr 02, 2001 | |
| 12738 | Grey | ABC | | Iusacell | Advisory - General | Jun 27, 2001 | |
| 9751 | Grey | DEF | | HOLDIN | Universal Access Investor buy-out (IBO) | Apr 30, 2001 | |

FIG. 7

Current User: ANURADHA TIRUPATHI

General View Screen

General Information - ID No: 14190

| Field | Value |
|---|---|
| List Type | Restricted |
| Transaction Type: | Advisory-M&A |
| Business Group: | UBS WARBURG |
| Code Name: | |
| Transaction Description: | |
| Date On: | Jan 30 2001 10:39 AM |
| Time of input: | Nov 26 2001 11:59AM |
| Transaction Timing: | Feb 2 2001 1:00AM |
| Tickler Date: | For tickler comments click here |
| Off Date/Time: | |
| Region: | United Kingdom |
| Responsible CO. | MICHAEL CORTESE-19 31 84481 |
| Transaction Director: | MICHAEL HERDE-19 337 6901 |
| Transaction Summary edit transaction summary | No comments found |
| | For additional comments click here |

General Information — 813
▲ Add Issuer
▲ Deal Team — 811
▲ Add Team Member
close

803

Edit Transaction

Issuer Information — 805

| Del | Edit Level | Issuer | AKA | Bloomberg | CUSIP | RIC | SEDOL | ISIN | Debt | LocalCode | Date On | Date Off |
|---|---|---|---|---|---|---|---|---|---|---|---|---|
| O | O | XYZ Bank | | | 571346 | C | N | 64219 | US18376421 | | Jan 30 2001 10 39 AM | |

Edit Issuer

Research Suppressions — 807

| Issuer | Forecast | Disclaimers | Ratings | Text | 138 | 139 | Market Maker | Research Coverage | Private Bank | Disclaimer Language comments | SA Comments comments | CO Comments comments |
|---|---|---|---|---|---|---|---|---|---|---|---|---|
| XYZ Bank | Global | N/A | N/A | N/A | No | No | N | N | Not Applicable | | | |

Sales & Trading Restrictions — 809

| Issuer | Code | Class | Restriction Comments |
|---|---|---|---|
| 801 → XYZ Bank | RL1 | Equity | comments |

Print Screen

FIG. 8

Deal Team/OTW Screen

General Information
▲ Add Issuer — 813
Deal Team — 811
▲ Add Team Member
close

Deal Team Information

| Edit | Employee Name | Business Phone | Sector/Product Group | Role | Business Area | Business Sector | Dept | Location | Rank | Line Manager | Approved By | On Date |
|---|---|---|---|---|---|---|---|---|---|---|---|---|
| ○ | MICHAEL CORTESE | 19 31 8448 1 | Equity Management | Member | CICPE Logistics | General Counsel | Compliance | United Kingdom | Executive Director | Peter Haines | | Jan 30, 2001 |
| ○ | FRED GREENBAUM | 19 337 7138 | Business Unit Controller | Member | CICPE Logistics | General Counsel | SECURITIES COMPLIANCE | Americas | Director | Michael Herde | | Jan 30, 2001 |
| ○ | MICHAEL HERDE | 19 337 6901 | Equity Management | TD | CICPE Logistics | General Counsel | SECURITIES COMPLIANCE | Americas | Executive Director | Robert Dinestein | | Jan 30, 2001 |
| ○ | JONATHAN NG | 19 337 3196 | Business Unit Controller | Member | CICPE Logistics | IT Development | IT Legal & Compliance | Americas | Associate Director | James Candy | | Jan 30, 2001 |
| ○ | ANURADHA TIRUPATHI | 19 337 1876 | Consumer Products & Retail | Member | CICPE Logistics | IT Development | IT Legal & Compliance | Americas | Non-Officer | Jonathan Ng | | Jan 30, 2001 |

TRADER QUERY RESPONSE SCREEN

NEW ADDITIONS TO THE RESTRICTED LIST DURING PAST 24 HOURS:

| Issuer (AKA) | RIC/USCODE | ISIN/CUSIP | SEDOL/DEBT | RLCODE/SEC | DATE ON/DATE OFF | COUNTRY/UBSW OFFICE | TRANSACTION TYPE | COMMENTS |
|---|---|---|---|---|---|---|---|---|
| APRIA HEALTHCARE GROUP | AHG.N / AHG | US0379331087 / 037933108 | 2052214 | RSHB Equity | Nov 27 2001 / Nov 28 2001 | US / New York | Research Rating | |
| ENRON CORP | ENE.N / EHE | US2935611069 / 293561106 | 2466019 | RSHS Equity | Nov 28 2001 / Nov 28 2001 | US / New York | Research Rating | |
| GUILFORD PHARMACEUTICALS | GLFD.O / GLFD | US4018291066 / 401829106 | 2395351 | RSHS Equity | Nov 28 2001 / Nov 28 2001 | US / New York | Research Rating | |
| HOVNANIAN K ENTERPRISES | | 44248BAD4 | | RSHB Specific Security | Nov 28 2001 / Nov 28 2001 | New York | Research Rating | 9.75% Sb Notes due 6/1/05 |
| HOVNANIAN K ENTERPRISES | | US44248BAH55 / 44248AHS | 2805979 | RSHB Specific Security | Nov 28 2001 / Nov 28 2001 | US / New York | Research Rating | Hovnanian 10.53% senior note due 2007 |
| LENNAR CORP | | US526057AB03 / 526057AB0 | 2426853 | RSHS Specific Security | Nov 28 2001 / Nov 28 2001 | US / New York | Research Rating | Lennar 7.625% senior notes due 2009. |
| LINCARE HLDGS INC | LNCR.O / LNCR | US5327911005 / 532791100 | 2515892 | RSHB Equity | Nov 27 2001 / Nov 28 2001 | US / New York | Research Rating | |
| PROXIM INC | PROX.O / PROX | US5329841000 / 7442E1100 | 2705819 | RLMT Equity | Nov 27 2001 | US / Los Angeles | Regulatory Position Limit | No trading restriction for UBS Warburg LLC or UBS Paine Webber |
| eRYLAND GROUP | | 7837664AH6 | | RSHB Specific Security | Nov 28 2001 / Nov 28 2001 | New York | Research Rating | 8% sr notes due 8/15/06. |
| RYLAND GROUP INC | | US7837644AF0 / 783764AF0 | 2634935 | RSHB Equity | Nov 28 2001 / Nov 28 2001 | US / New York | Research Rating | RYLAND 9.75% senior note due 2010. |

REMOVED FROM THE RESTRICTED LIST DURING PAST 24 HOURS:

| Issuer (AKA) | RIC/USCODE | ISIN/CUSIP | SEDOL/DEBT | RLCODE/SEC | DATE ON/DATE OFF | COUNTRY/UBSW OFFICE | TRANSACTION TYPE | COMMENTS |
|---|---|---|---|---|---|---|---|---|
| BURLINGTON NORTHERN SANTA FE CORP | BNI.N / BNI | US12189T1043 / 12189T104 | 2154927 | RSHB Equity | Nov 26 2001 / Nov 27 2001 | US / New York | Research Rating | |
| FEDERAL AGRICULTURAL MORTGAGE CORP | AGM.O / AGM | US3131483063 / 313148306 | 2363381 | RSHS Equity | Nov 27 2001 / Nov 27 2001 | US / New York | Research Rating | |
| FEDERATED DEPARTMENT STORES INC. | FD.N / FD | US31410H1014 / 31410H101 | 2345022 | RSHB Equity | Nov 27 2001 / Nov 27 2001 | US / New York | Research Rating | |
| MELLON FINANCIAL CO | MEL.N / MEL | US5856551A1088 / 58551A108 | 2576350 | RSHS Equity | Nov 27 2001 / Nov 27 2001 | US / New York | Research Rating | |
| STATE STREET CORP | STT.N / STT | US8574771031 / 857477103 | 2842040 | RSHS Equity | Nov 26 2001 / Nov 27 2001 | US / New York | Research Rating | |
| UNION PACIFIC CORP | UNP.N / STT | US9078181081 / 857477103 | 2914734 | RSHB Equity | Nov 27 2001 / Nov 27 2001 | US / New York | Research Rating | |

FIG. 11

SA Query Results Screen

SEARCH RESULTS FOR GREY AND RESTRICTED LIST SECURITIES  [Print Screen]  ▲GLS Home

| List Comments | Sensitivity Level ▼ | Issuer ▲ ▼ [Aka] | Symbol Isin | Date On ▲ ▼ Date Off | Country ▼ | Sup 138 ▶ Sup 139 ▶ | Over The Wall ▼ Department | Transaction |
|---|---|---|---|---|---|---|---|---|
| Restricted comments | | ABC INTERNATIONAL | US12345 | Dec 07, 2000 | | | | IPO |
| | Grey | DEF INC | TW67890 | Nov 23, 2001 | TW | No No | | |
| Grey comments | | GHI NV | | Nov 12, 2001 | | | | |
| Restricted comments | | JKL FUND INC | US576134 | Nov 16, 2001 | US | No 139A/B | MAIER EQ Res US Special Situations | Other |
| | Grey | MNO | DR8934 | Apr 02, 2001 | | | | |

Search Transactions

List Type:  ⊙ All  ○ Grey  ○ Restricted

Issuer Name ▶ [          ]  Exact Match ☐

▶ search

FIG. 13

Private Bank Results Screen

▶GLS Home

ACTIVE PRIVATE BANK RESTRICTED LIST SECURITIES — 1403

| ISSUER (AKA) | DATE ON / DATE OFF | SYMBOL RIC | ISIN SEDOL | COUNTRY | LOCATION OFFICER | TRANSACTION | RESTRICTION |
|---|---|---|---|---|---|---|---|
| ABC CREDIT AGR [ABC] | Nov 19, 2001 | SA123 | | | London KATHRYN WILLS | IPO | Global |
| DEF | Nov 19, 2001 | SA145 | | | London KATHRYN WILLS | IPO | Global |
| GHI | Nov 19, 2001 | CON678 | | | London KATHRYN WILLS | Equity Offering | Global |
| JKL | Nov 19, 2001 | CON910 | | | London KATHRYN WILLS | Equity Offering | Global |
| MNO | Nov 19, 2001 | EDAG112 | | | London KATHRYN WILLS | IPO | Global |
| PQR AG | Oct 03, 2001 | OZn S134 | P01626826 172 | | Zurich Sabine Wey | Other | Global |
| STU | Oct 29, 2001 | 678BC | V0164199 1S199 | GB | London MICHAEL CORTESE | Follow-on/Secondary | Global |
| VWX | Oct 22, 2001 | DE641 | A00241511 Y918 | NL | London KATHRYN WILLS | Advisory - M&A | Panel Review |
| YZ TECHNOLOGY & INCOME C | Aug 24, 2001 | GH32 | B09529180 C758 | JE | London KATHRYN WILLS | Advisory - M&A | Panel Review |
| ABC HLDGS | Oct 22, 2001 | | G09257065 H5705 | GB | London KATHRYN WILLS | Advisory - M&A | Panel Review |
| DEF [DER] STOCK EXCHANGE | Oct 22, 2001 | DE123 | I09529859 H5705 | GB | London KATHRYN WILLS | Advisory - M&A | Panel Review |
| GHI | Oct 22, 2001 | GH421 | K09528869 L2985 | GB | London KATHRYN WILLS | Advisory - M&A | Panel Review |
| JKL CABLE CORP | Oct 11, 2001 | JK36 | M38271095 N2019 | US | New York KATHY SEIDE | Advisory - General | Global |
| MNO GROUP INC | May 04, 2001 | MN24 | P56291057 H8707 | US | New York MITCHELL WEINSTEIN | Advisory | Global |
| PQR ITALIA | Sept 24, 2001 | H0035 | | | London MICHAEL CORTESE | IPO | Global |
| STU GROUP | Oct 03, 2001 | 17304=s | BA9173045 H9746 | | Zurich SABINE WEY | Other | Global |
| VWX GAS SPA | Sep 24, 2001 | V0035 | | CH | London MICHAEL CORTESE | IPO | Global |
| YZA | Sep 07, 2001 | Z0118 | | | London MICHAEL CORTESE | IPO | US&Japan & Canada |
| BCD | Oct 03, 2001 | | A08815067 | | Zurich SABINE WEY | Other | Global |
| EFG INCOME TRUST | Aug 24, 2001 | E897 | B07729782 C2978 | JE | London KATHRYN WILLS | Advisory - M&A | Panel Review |
| UBS AG | Jun 28, 2000 | | D10740741 C2978 | CH | Sydney MYLES BAXTER | Other | Global |
| HIJ | JNov 19, 2001 | | C11075394 B6134 | CH | London KATHRYN WILLS | Equity Offering | Global |

FIG. 14

GLOBAL COMPLIANCE SYSTEM

CROSS-REFERENCE TO RELATED APPLICATION

This application is a continuation of U.S. patent application Ser. No. 10/090,285, filed on Mar. 4, 2002, which claims the benefit of the filing date of U.S. Provisional Application No. 60/289,975 entitled "Global Compliance System" which was filed on May 10, 2001, the entire contents of which are incorporated by reference in their entirety.

BACKGROUND

The following invention relates to compliance systems and, in particular, to a system for implementing a compliance program in a geographically-dispersed financial institution. United States securities laws and the laws of other nations make it unlawful, in some circumstances, for a person who possesses non-public, material information about an issuer ("inside information") of publicly traded securities to trade in the securities without disclosing the information to the counterparty, or to "tip" others to the information. Broker dealers that engage in investment banking including both public underwriting and financial advice to public companies in mergers and acquisitions transactions often receive inside information. As a result they would be disabled from proprietary trading, including market making, publishing research, giving investment recommendations and managing money unless there were an effective way to prevent those engaged in those activities from learning about the inside information, as well as legal recognition of such policies and procedures to prevent attribution of the inside information to the broker dealer's traders, research analysts, portfolio manager and sales personnel even in the absence of such actual knowledge.

The enactment of the Insider Trading and Securities Fraud Enforcement Act ("ITSFEA") in 1988 strengthened the Securities and Exchange Commission's ("SEC") enforcement powers over insider trading and created an explicit duty for U.S. brokers dealers to establish, maintain and enforce procedures designed to control the flow on inside information. Neither the SEC nor the self regulatory organization's have promulgated regulations specifying the policies and procedures that will be deemed adequate in connection with the misuse of inside information. However, the SEC has identified several "minimum elements" necessary for the establishment of adequate procedures. Specifically, broker dealers must, among others things, (i) review customer, employee and proprietary trading through effective maintenance of some combination of watch and restricted lists, (ii) maintain a substantial Compliance Department control over relevant interdepartmental communications, and (iii) conduct heightened reviews when a firm possesses inside information.

In implementing the required policies and procedures broker dealers typically maintain a list, sometimes called a Grey List or Watch List, that includes all companies about which employees of the financial institution (for example, bankers) have knowledge of material non-public information. New companies are added to the Grey List when financial institution employees become privy to material non-public information regarding such companies. In order to add a company to the Grey List, a banker typically calls a compliance officer of the financial institution indicating that the broker dealer has, or is likely to possess inside information regarding a particular company. The Compliance Department gathers the relevant information and places the company on the Grey List in which case the employees that are involved in advising the company are restricted from trading in the stock of the company. Furthermore, the broker dealer monitors the transactions of its employees and proprietary traders in the given company in order to detect potential misuse of the information.

In certain cases, when a financial institution's professional involvement with a company is made public, trading restrictions are imposed. For example, if the financial institution is advising Company A in its attempt to acquire Company B and the information has been made public, employees generally are restricted from trading the stock of Company A and Company B as well as engaging in any other investment or advisory activities that creates an appearance of impropriety. In addition, restrictions on proprietary trading and customer solicitation also may be imposed.

The prior art processes for managing the compliance obligations of financial institutions typically include a compliance officer of the institution that receiving from the institution's bankers information regarding the bankers' advising activities with respect to particular companies. Based on the nature of these activities and the status of any transactions contemplated by the bankers' clients, the compliance officer then places the particular companies on the Grey List, the Restricted List or no list altogether. If a particular company is placed on either the Grey List or Restricted List, then the compliance officer also includes details of the contemplated transaction such as expected timing of the deal, the composition of the deal team, the details of the transaction, etc.

Certain employees of many broker dealers are required by firm policy to pre-clear personal securities transactions. The employee must interact with the compliance officer to determine whether the trade includes a company on either the Grey List or Restricted List. If the trade includes a company on the Restricted List, then the compliance officer indicates to the employee that the employee is prohibited from making the contemplated trade. If the trade includes a company on the Grey List, then the compliance officer will generally not prohibit the trade unless the inquiring employee is directly involved in advising the company and therefore would be in the position of knowing material non-public information regarding the company.

In addition to pre-clearing trades, the prior art compliance processes also include monitoring the trading activity of employees throughout the institution for each company on the Grey List. If the compliance officer notices an increase in trading activity in any of the companies on the Grey List, then the compliance officer may initiate an investigation to determine whether the trading activity is a result of improper use of any material non-public information.

The prior art processes used by financial institutions for monitoring trading activities for compliance with insider trader regulations have numerous shortcomings. First, the process of pre-clearing a trade typically requires the compliance officer to individually review each trade request received from employees to determine if any of the underlying companies are on the Grey List or Restricted List. This is a manually intensive and slow process resulting in two problems for financial institutions. First, this requires that financial institutions allocate scarce and precious compliance resources to a purely ministerial function, precluding the opportunity to apply those resources against higher level compliance services. Second, employees desiring to execute trades may not receive clearance in time to execute the trade at a favorable price. This problem is further exacerbated in fast-paced financial markets when waiting for a compliance officer to approve a trade is unacceptable. Maintaining a compliance program in globally dispersed financial institutions is even more problematic because of the difficulty in providing employees a trade pre-clearance that may depend on updates to the Grey List and/or Restricted List that originates several time zones away. The inability of the prior art compliance processes to efficiently manage the Grey List and Restricted List in a global context may result, for example, in a Japanese employee executing a trade in the stock of a particular company that a New York-based banker is advising because the Restricted List has not yet been updated by the New York compliance officer who may not be available to otherwise pre-clear the trade during Japanese trading hours. Because the prior art compliance processes are inefficient and often ineffective at spotting Grey List and Restricted List trading violations, a financial institution may be subject to substantial fines for its inability to monitor and prevent trades that violate insider trading regulations.

Accordingly, it is desirable to provide a system for implementing a compliance program in a geographically-dispersed financial institution.

SUMMARY OF THE INVENTION

The present invention is directed to overcoming the drawbacks of the prior art. Under the present invention a system for implementing a compliance program in a financial institution is provided and includes a list database for storing material information regarding a plurality of entities that is known to said financial institution. Also included is a list manager that receives a compliance query from an affiliate of the financial institution having a status. The list manager provides a compliance response to the affiliate based on the plurality of entities and according to the status of the affiliate.

According to an exemplary embodiment, the material information regarding the plurality of entities is partitioned into a Grey List and a Restricted List.

According to another exemplary embodiment, the affiliate is an employee, the compliance query is a request by the employee to trade a security of an entity and the compliance response is a denial of the request to trade if the entity is included in the partition of the plurality of entities included in the Restricted List.

According to yet another exemplary embodiment, the affiliate is a trader, the compliance request is a request to trade a security of an entity and the compliance response includes at least one of the plurality of entities included in the Restricted List and a clearance code.

In still yet another exemplary embodiment, associated with the at least one of the plurality of entities is a transaction type and the request to trade has an activity type and wherein the clearance code denies the request to trade based on the transaction type and the activity type.

In an exemplary embodiment, the transaction type is selected from a group including mergers and acquisitions, initial public offerings and tender offers.

In another exemplary embodiment, the activity type is selected from a group including principal activity, market making activity, positional trading activity and derivative trading activity.

In yet another exemplary embodiment, the affiliate is a supervisory analyst, the compliance request is a request to issue a report regarding an entity and the compliance response includes at least one of the plurality of entities included in a combination of the Restricted List and the Grey List.

In still yet another exemplary embodiment, the compliance response includes at least one safe harbor provision that grants at least a portion of the compliance request.

In an exemplary embodiment, the grant of the portion of the compliance request is based on geography.

In another exemplary embodiment, the affiliate is a compliance officer, the compliance request is a request to view at least a portion of a combination of the Restricted List and the Grey list and the compliance response includes the portion of the combination of the Restricted List and the Grey List.

In yet another exemplary embodiment, the compliance response includes for at least one of the plurality of entities included in the portion a clearance code and a transaction type.

In still yet another exemplary embodiment, the compliance response includes for at least one of the plurality of entities included in the portion a safe harbor provision.

In an exemplary embodiment, a surveillance system is included that receives the plurality of entities stored in the list database for monitoring trading activity in accordance with the compliance program.

In another exemplary embodiment, the list database receives the plurality of entities from a compliance officer in communications with the system.

In yet another exemplary embodiment, the list database receives at least a portion of the plurality of entities from a transaction information source.

In still yet another exemplary embodiment, the list database receives positional information relating to the financial institution and the compliance response is based on the positional information.

In an exemplary embodiment, the list database receives affiliate directorship information and the compliance response is based on the affiliate directorship information.

Under the present invention, a method for implementing a compliance program in a financial institution is provided and includes the step of storing a plurality of entities in which the financial institution is associated with each of said plurality of entities. Next, a compliance query is received from an affiliate of the financial institution having a status. Finally, a compliance response is provided to the affiliate based on the plurality of entities and according to the status of the affiliate.

In an exemplary embodiment, the plurality of entities is partitioned into a Grey List and a Restricted List.

In another exemplary embodiment, trading activity is monitored in accordance with the compliance program based on the plurality of entities stored.

In yet another exemplary embodiment, the plurality of entities is received from a compliance officer.

In still yet another exemplary embodiment, at least a portion of said plurality of entities is received from a from a transaction information source.

In an exemplary embodiment, positional information relating to said financial institution is received and the compliance response based on the positional information is provided.

In another exemplary embodiment, affiliate directorship information is received and the compliance response based on the affiliate directorship information is provided.

Under the present invention, a system is provided for monitoring trading activity of a trading system operated by a financial institution in accordance with a compliance program wherein the trading system receives a trade request to trade a security of an entity. The system includes a list database for storing a plurality of entities wherein the financial institution is associated with each of the plurality of entities. The trading system receives the plurality of entities from the list database and allows the trade request if the entity is not included in any of the plurality of entities.

Under the present invention, a method for monitoring trading activity of a trading system operated by a financial institution in accordance with a compliance program is provided and includes the step of storing a plurality of entities wherein the financial institution is associated with each of the plurality of entities. Next, a trade request to trade a security of an entity is received. Next, it is determined whether the entity is included in the plurality of entities. Finally, the trade request is allowed if the entity is not included in the plurality of entities.

Accordingly, a method and system is provided for implementing a compliance program in a geographically-dispersed financial institution.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a filler understanding of the invention, reference is made to the following description taken in conjunction with the accompanying drawings, in which:

FIG. 2 is a screenshot of an add transaction screen included in the compliance system of FIG. 1;

FIG. 3 is a screenshot of an add issuer detail screen included in the compliance system of FIG. 1;

FIG. 4 is a screenshot of an add deal team detail screen included in the compliance system of FIG. 1;

FIG. 5 is a screenshot of a Grey List issuer detail screen included in the compliance system of FIG. 1;

FIG. 7 is a screenshot of a query results screen included in the compliance system of FIG. 1;

FIG. 8 is a screenshot of a general view screen included in the compliance system of FIG. 1;

FIG. 10 is a screenshot of a deal team screen included in the compliance system of FIG. 1;

FIG. 11 is a screenshot of a trader query response screen included in the compliance system of FIG. 1;

FIG. 13 is a screenshot of a supervisory analyst query response screen included in the compliance system of FIG. 1;

FIG. 14 is a screenshot of a private bank result screen included in the compliance system of FIG. 1;

DETAILED DESCRIPTION OF THE PREFERRED EMBODIMENTS

Figure 1:
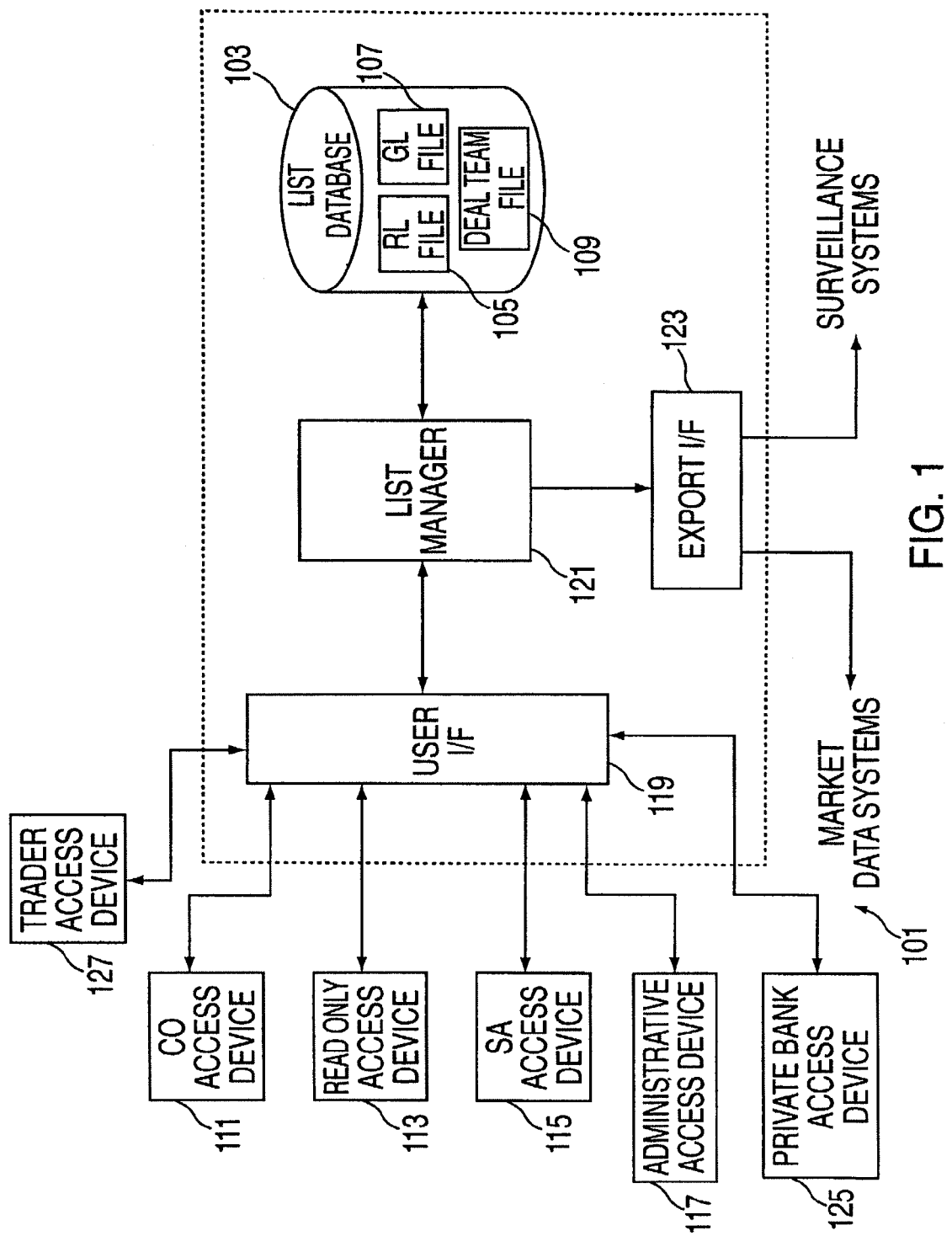
FIG. 1 is a block diagram of a global compliance system of the present invention.

Referring now to FIG. 1, there is shown a block diagram of a global compliance system 101 of the present invention. System 101 is typically operated by a financial institution that receives material information regarding their clients and therefore must take steps to prevent its employees, traders and analysts from engaging in activities pertaining to those clients while the material information is not publicly known. In an exemplary embodiment, the material information may also include, by way of non-limiting example, employee registration status, human resources information and any other information that may be relevant to performing a compliance function. According to an exemplary embodiment, system 101 is a computer system that executes software that performs the functions to be described below.

At the heart of system 101 is a list database 103 that contains a plurality of entities about which any of the employees (for example, bankers) of the financial institution has material non-public information. The entities contained in list database 103 are partitioned into a plurality of files including at least a restricted list file 105 that includes those entities that are on the financial institution's Restricted List and a Grey list file 107 that includes those entities that are on the financial institution's Grey List. List database 103 also includes a deal team file 109 that includes for each entity included in either restricted list file 105 or Grey list file 107 any employees of the financial institution that are a member of a team that is in possession of material non-public information pertaining to the entity.

In an exemplary embodiment, restricted list file 105, Grey list file 107 and deal team file 109 included in list database 103 are populated by a compliance officer that is affiliated with the financial institution for maintaining the financial institution's Restricted List and Grey List. To populate list database 103, the compliance officer uses a compliance officer (CO) access device 111 (for example, a personal computer) to communicate with system 101 using any known communications method and protocol, such as the Internet. CO access device 111 interfaces with a user interface 119 that provides the compliance officer with the various data entry screens to enter and maintain the Restricted List and Grey List, as will be described below. System 101 also includes a list manager that receives the compliance officer's data entry and requests from user interface 119 and either retrieves the requested information from or causes information to be stored in list database 103, as appropriate.

Typically, the compliance officer receives from employees in the financial institution, such as bankers, the names of entities for which the employees have a relationship and therefore may be in possession of material non-public information. Generally, a banker may receive such material non-public information in the context of advising the entity with respect to a transaction, such as a merger or an initial public offering. The compliance officers determine whether any particular entity forwarded by a banker should be added to the financial institution's Grey List or Restricted List or other lists that may be maintained. If the compliance officer determines that a particular entity should be included in one of the lists, the compliance officer then determines under what circumstances should trading activity or the publication of research be allowed in the securities of that particular entity. Such a determination may be governed by policies set by the financial institution and/or government regulations as well as other business considerations. When the compliance officer receives from the financial institution employees information regarding entities that the compliance officer determines should be included in either the financial institution's Restricted List or Grey List, the compliance officer operates CO access device 111 to input this information into list database 103. Before an analyst affiliated with the financial institution issues a report regarding an entity, a supervisory analyst (SA) typically checks whether the issuing entity is on either the financial institution's Restricted List or Grey list and, if so, what restrictions have been placed on publishing research about a particular security issued by the entity. Supervisory Analysts use SA Access Device 115 to access the system 101 using any known communication protocol. SAs are given a limited read only access to Restricted List and Grey List entered by the Compliance Officers. Private Bankers access the system by using Private Bank Access Device 125 to retrieve a list of securities which are Restricted only to Private Bankers by the Compliance Officers. Some users are given a read only access to the Compliance Officer Home Page. These include people who have the rights to view the non-public information but do not have the rights to make any changes to them. They access the system using the Read Only Access Device 113. Trader Access Device 127 is used by the trader typically to check whether the security he wishes to trade on is on the financial institution's Restricted List and, if so, what restrictions have been placed on trading the particular security. Finally, Administrative Access Device 117 is given to the system administrators. This access level gives administrators the right to add new users to the system, delete deals that are not relevant, send out Restricted List emails to the concerned persons and make announcements to all the compliance officers using the system. One compliance officer per region is given administrative access to the system.

Referring now to FIG. 2, there is shown a screenshot of an add transaction screen 201 via which a compliance officer adds general information regarding an entity to be added to list database 103. Initially, the compliance officer selects in a list type field 203 the particular list—Restricted List, Grey List or Radar List—in which the entity is to be included. The compliance officer then adds additional information regarding the entity and a contemplated transaction involving the entity in various fields. For example, the compliance officer enters the name of the business group of the financial institution that is engaged with the entity into a business group field 205; the date on which the entity's inclusion in the particular list is effective in an effective date field 207; the expected date the contemplated transaction is to take place in a transaction timing field 209; a tickler date that will be used by the compliance officers as a reminder in a tickler date field 211; the date on which the entity will be removed from the particular list in a off date field 213 and the name of the responsible compliance officer in a compliance officer field 215. Next, the compliance officer enters into a transaction type field 217 the type of transaction regarding which the financial institution is advising the entity. Such transaction types may be any type of transaction in which an entity may be engaged or any type of advisory services a financial institution may provide pertaining to the entity including, by way of non-limiting example, a merger and acquisition, an initial public offering and a tender offer. Finally, the compliance officers enters a code name into a code name field 219, a brief description of the contemplated transaction in a transaction description field 221, tickler comments (as a reminder on the ticker date) in the tickler comments field 223 and comments regarding the transaction in a transaction comments field 223.

Referring now to FIG. 3, there is shown a screenshot of an add issuer detail screen 301 into which the compliance officer enters details regarding entity transactions for entities to be included in the Restricted List. The detailed information entered into screen 301 is primarily divided into three sections: a sales and trading restrictions section 335, a research suppressions section 337 and an additional issuer information section 339. In sales and trading restrictions section 335, the compliance officer enters information that describes the extent to which salespeople and traders associated with the financial institution are restricted in trading the securities of the particular entity. For example, the compliance officer enters a restriction code into a restriction code field 303. The restriction code indicates what activities for each transaction type involving the entity or its securities are permissible and/or prohibited. Transaction types may include, by way of non-limiting example, M&A transactions, initial public offerings and tender offers. For each transaction type, traders and salespeople may be allowed/prohibited to engage in certain activity types including, by way of non-limiting example, market making activity, principal trading activity, positional trading activity, proprietary trading activity and client solicitation. For instance, if the transaction type is M&A (i.e., the financial institution is advising the entity in an M&A transaction), then the trader may be prohibited from engaging in proprietary trading activity (trading on behalf of the financial institution). Similarly, any other transaction types and activity types may be defined and a restriction code may be designated to indicate to a trader what activity types are permissible/restricted for a given transaction type.

The compliance officer also enters into an applicable class field 305 the type of security for which the restriction applies. Finally, the compliance officer may enter any additional comments regarding the restriction in a restriction comments field 306. The information the compliance officer enters into sales and trading restrictions section 327 are provided to an inquiring trader to guide the trader's trading activities, as will be described below.

The compliance officer also enters information into research suppressions section 337 for the purpose of restricting the activities of research analysts that may be issuing a research report pertaining to an entity on the Restricted List. First, the compliance officer enters into a forecast field 307 the scope to which the financial institution analysts are restricted from issuing a forecast regarding an entity of the Restricted List. For example, the compliance officer may select a "Global" restriction that indicates that the analysts are restricted from issuing a forecast regarding the entity anywhere in the world. In certain cases the compliance officer may only restrict an analyst from issuing a forecast about a particular entity in the United States or some other region of the world. In other cases, the compliance officer may not restrict analysts from issuing a forecast altogether. The compliance officer also enters into a Rating/Recommendation field 309 the scope to which the analysts may issue a rating/recommendation regarding the entity. For example, the compliance officer may restrict the analysts from issuing a rating recommendation globally, regionally or not at all. Next, the compliance officer will indicate in a Safe Harbor: Rule 138 field 311 and a Safe Harbor: Rule 139 field 317 whether the Rule 138 and/or Rule 139 safe harbors, respectively, apply for the particular entity. In a Research Text field 315, the compliance officer enters the geographic regions in which the analysts are restricted from issuing research text.

In addition, the compliance officer enters into a Role field 313 the role the financial institution is playing in the transaction involving the particular entity. For example, if the financial institution is a Manager/Co-Manager of an initial public offering involving the entity, then the compliance officers enters this information into Role field 313. Sensitivity level of the security is set in sensitivity field 318. The compliance officer also enters into an SA comments field 319 in research suppressions section 337 any comments appropriate for a supervisory analyst, into CO comments field 321 any comments appropriate for compliance officers and into Disclaimer Language field 323 any specific disclaimer language an analyst must include in a research report pertaining to an entity that is in the Restricted List.

Screen 301 also includes an additional user information section 339 that includes a local code field 325 for entering the Bloomberg symbol if it is not obtained from the database that contains the security details. Aka field 327 is used to enter aliases to the selected security. For example, International Business Machines is also know as IBM, International Busn Machine etc., and these aliases can be entered in aka field 327. This feature is useful as the user can search for a security using the alias names. The compliance officer selects either Private Bank, Asset Management or Private Bank Asset Management if a security has to be on the Restricted List for the Private Bankers. It is set to Not Applicable if it does not concern the Private Bankers. Market Maker is set to either Yes or No in the Market Maker field 331 and Research Coverage is set to either Yes or No in the Research Coverage field 333.

Referring now to FIG. 4, there is shown a screenshot of an add deal team detail screen 401 into which the compliance officer enters details regarding the deal team in the financial institution that is advising the particular entity regarding a transaction. Screen 401 includes fields to enter pertinent information regarding each member of the team including a role field 403 for enter the deal team member's role, a sector/product group field 404 for entering the group to which the team member belongs, an effective on date field 405 for entering the date the particular team member joined the team and a comments field 406.

Referring now to FIG. 5, there is shown a screenshot of a Grey List issuer detail screen 501 into which the compliance officer enters details regarding entities to be included in the Grey List. In screen 501, the sensitivity level of the security is selected in the sensitivity field 503, the compliance officer enters any comments regarding the entity that is suitable for a supervisory analyst into a SA comments field 505. "No research allowed-IPO" is an example of an SA comment entered by the compliance officer that will be used as a reference by the supervisory analysts. Any comments regarding the entity that is suitable for a compliance officer is entered into a CO comments field 507, ("Watch research" is an example of the CO comment that may be entered by a Compliance Officer). In addition, a local code is entered into a local code field 509, a aka into aka field 511, a market maker into market maker field 513 and research coverage into research coverage field 515.

Figure 6:
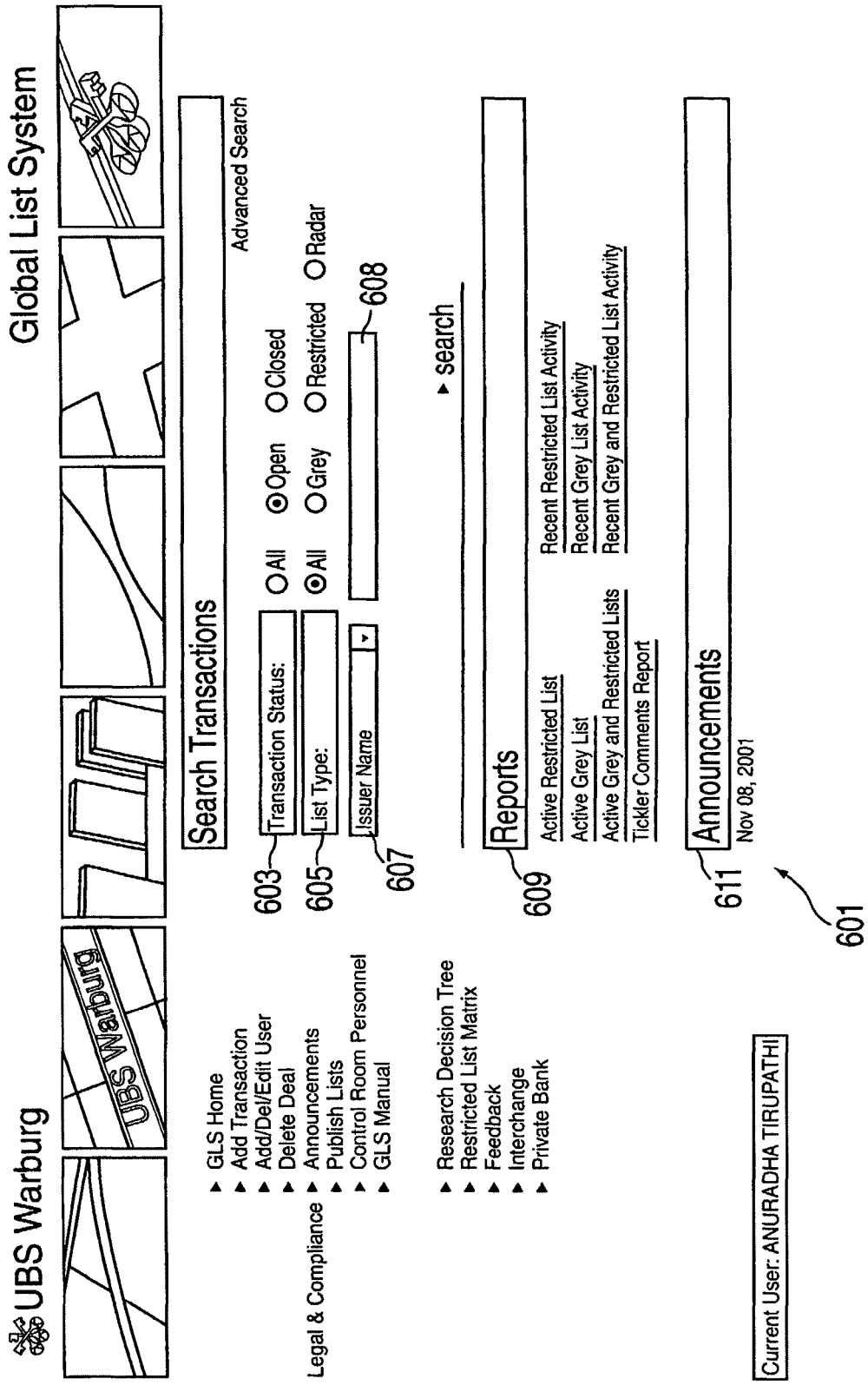
FIG. 6 is a screenshot of a search transactions screen included in the compliance system of FIG. 1.

Referring now to FIG. 6, there is shown a screenshot of a search transactions screen 601 via which a compliance officer may search list database 103 for entities that match a particular search criteria. In the exemplary embodiment depicted in screen 601, a compliance officer may search list database 103 by selecting in a transaction status field 603 a transaction status (for e.g., Open, Closed or All), for the purpose of retrieving from list database 103 those entities that are involved in a transaction that meets the selected transaction status. The compliance officer selects in a list type field 605 the type of list that is to be searched including the Grey List, the Restricted List, the RADAR List or a combination of all of these lists. The compliance officer also selects the security search criteria by either choosing the security name search, Bloomberg symbol search, cusip code search, isin code search, sedol code search, Reuters code search or the code name search in the search criteria field 607 and enters into a security name field 608 the name of a particular entity to be searched for in list database 103. In an exemplary embodiment, the input into security name field 608 may be a partial input and the search mechanism used may be a fuzzy search or any other search mechanism that provides search results based on a partial input. Reports Section 609 has reports that generate Active Grey Lists, Active Restricted Lists, Active Grey and Restricted Lists, Recent Grey Lists, Recent Restricted Lists and Recent Grey and Restricted Lists. Compliance officers and Supervisory Analysts have access to these reports. Tickler Comments Report is used only by the Compliance Officers. There is a section for Announcements 611 where the administrator can enter comments that will be viewed by all the compliance officers.

Referring now to FIG. 7, there is shown a screenshot of a query results screen 701 that is generated by a search request invoked by search transactions screen 601. Screen 701 displays various fields of information for each entity that meet the search criteria including a Txn ID field 703 which is a unique identifier for a particular deal, a list field 705 that indicates the list type in which the entity is included, an issuer field 707 that is the name of the entity, an aka field 709 that is the alias for the security, a transaction field 711 that indicates the transaction type regarding which the financial institution is advising the entity, a date on field 713 that is the date the entity was placed on the particular list (for the given transaction) and a date off field 715 that is the date the entity (for a particular transaction) is to be removed from the given list. In an exemplary embodiment, any other suitable information may also be displayed in results screen 701.

Referring now to FIG. 8, there is shown a screenshot of a general view screen 801 that is displayed when an entity listed in results screen 701 is selected using the txn Id (for e.g., by clicking on the entity with a computer mouse). A compliance officer may also accesses general view screen 701 by activating a general information link 813. General view screen 801 is divided into four sections: a general information section 803 that summarizes the information the compliance officer entered via general information screen 201, an issuer information section 805 that summarizes information regarding a particular security of an entity entered via the issuer information screen 301 and also additional information retrieved from the database that stores the issuer details like the cusip, sedol, Bloomberg symbol, isin etc., a research suppressions section 807 and a sales & trading restrictions section 809 that summarizes information entered via issuer detail screen 301. In an exemplary embodiment, the compliance officer may directly edit any information contained in general view screen 801.

Figure 9:
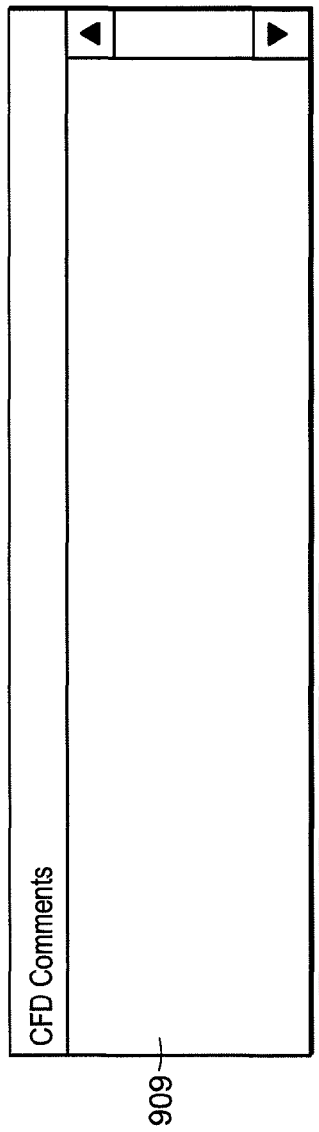
FIG. 9 is a screenshot of a transaction comment screen included in the compliance system of FIG. 1.

Referring now to FIG. 9, there is shown a screenshot of a transaction comment screen 901 that includes any comments made regarding a particular entity for a given transaction. A compliance officer accesses transaction comment screen 901 by activating an additional comment link in the general information section 803. Transaction comment screen 901 includes a comment date section 903 that lists the date, the comment author section 905 that lists the name of the author and the content section 907 that contains the comment made. A comment field 905 is included that displays the text of all the comments made by each author listed in comment author section 909. A comment entered into the comment field 909 can be submitted as either a transaction comment by clicking on submit button 913 or can be submitted as the CFD comment by clicking on the submitcfd button 911. The CFD comment is entered by the compliance officers regarding the entity that is suitable for the Corporate Finance Department.

Referring now to FIG. 10, there is shown a screenshot of a deal team screen 1001 that lists information regarding all the members of a team that is involved with advising the entity for the particular transaction. A compliance officer may accesses deal team screen 1001 by activating a deal team link 811.

Thus, a compliance officer uses CO access device 111 to interact with system 101 for maintaining restricted list file 105, Grey list file 107 and deal team file 109 stored in list database 103.

Before a trader affiliated with the financial institution places a trade in a security issued by an entity, either for a financial institution client or on behalf of the financial institution itself, the trader is typically required to check whether the issuing entity is on the financial institution's Restricted List and, if so, what restrictions have been placed on trading the particular security. To make such a determination, the trader operates a trader access device 127 (for example, a personal computer executing suitable software) that communicates with system 101 using any known communications method and protocol, such as the Internet. Trader access device interfaces with user interface 119 for sending to list manager 121 a query from the trader regarding whether a particular entity is on the Restricted List. List manager 121 retrieves the responsive information from restricted list file 105 contained in list database 103 and forwards the information to trader access device 127 via user interface 119.

Referring now to FIG. 11, there is shown a screenshot of a trader query response screen 1101 according to an exemplary embodiment that includes at least a portion of the Restricted List that is responsive to a trader's query. Response 1101 includes a new addition section 1103 that lists entities that have been recently added to the Restricted List. For each entity included in new addition section 1103, information is provided upon which the trader can determine whether a contemplated trade is restricted. For example, included is an issuer field 1104 that lists the name of the particular entity, a plurality of issuer ID number fields 1105 that include the ID number of the entity security that is restricted, an RL code field 1106 that indicates the restriction level set by the compliance officer (in restriction code field 303 of issuer detail screen 301) for the particular entity, a date field 1107 that indicates the date the entity was placed on the Restricted List and the date it is expected that the entity will be removed from the Restricted List guide (as provided by the compliance office via general information screen 201), a location field 1108 that indicates the location within the financial institution from which the restriction regarding the entity originated, a transaction type field 1109 that indicates the nature of the relationship between the financial institution and the entity and the type of transaction for which the financial institution is advising the entity and a comments field 1110 that provides the trader with any comments regarding the restriction that the compliance officer has inserted into restriction comments field 306 of issuer detail screen 301.

Response 1101 also includes a removed section 1111 that provides similar information as provided in new additions section 1103 for entities that have been recently removed to the Restricted List.

Based on the restriction included in RL code field 1106 (as described above), the inquiring trader determines whether contemplated transaction is restricted.

Before an analyst affiliated with the financial institution issues a report regarding an entity, a supervisory analyst (SA) typically checks whether the issuing entity is on either the financial institution's Restricted List or Grey List and, if so, what restrictions have been placed on publishing research about a particular security issued by the entity. To make such a determination, the SA operates an SA access device 115 (for example, a personal computer executing suitable software) that communicates with system 101 using any known communications method and protocol, such as the Internet. SA access device interfaces with user interface 119 for sending to list manager 121 a query from the SA regarding whether a particular entity is on either the Restricted List or Grey List. List manager 121 retrieves the responsive information from restricted list file 105 and Grey list file 107 contained in list database 103 and forwards the information to SA access device 115 via user interface 119.

Figure 12:
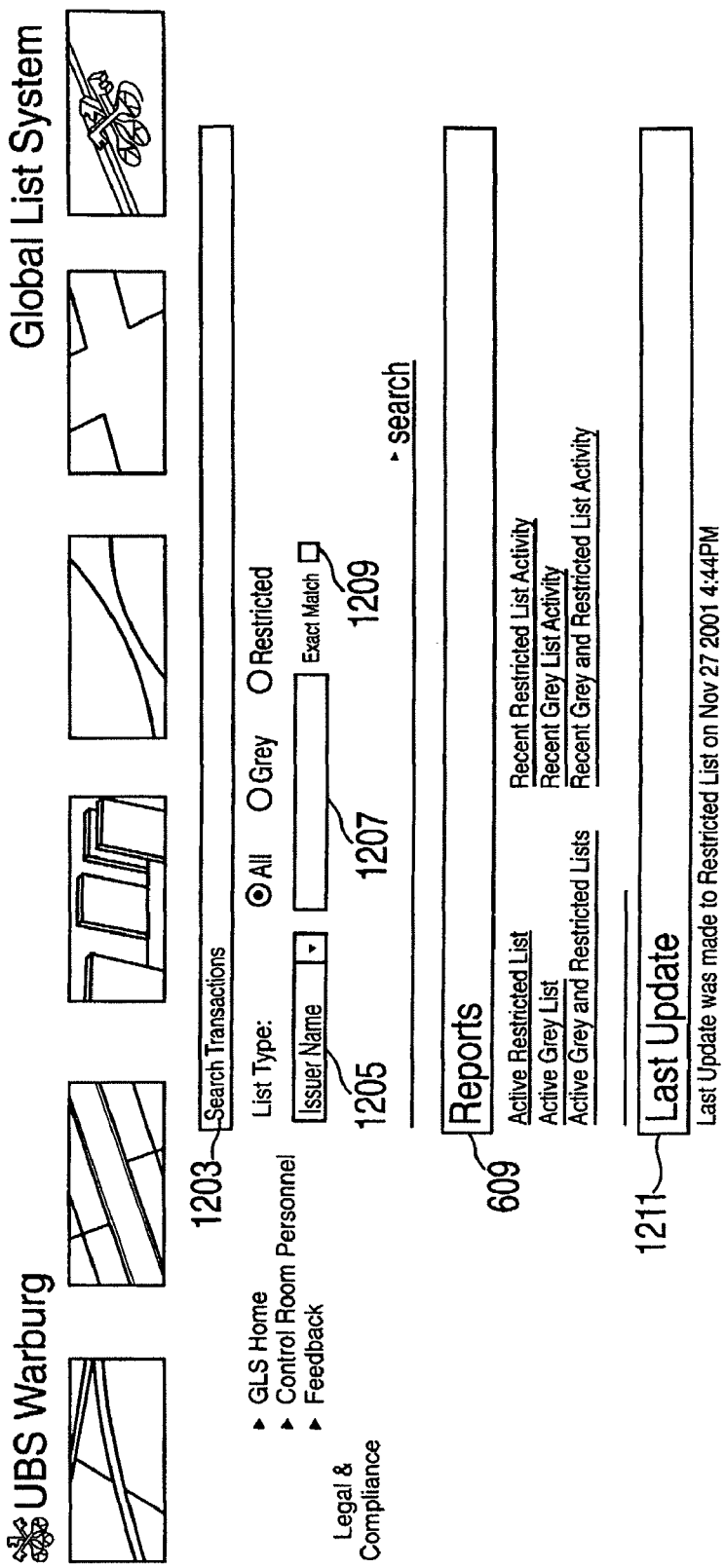
FIG. 12 is a screenshot of a supervisory analyst search transactions screen included in the compliance system of FIG. 1.

Referring now to FIG. 12, there is shown a screenshot of a supervisory analyst home page screen 1201. In the exemplary embodiment depicted in screen 1201, the supervisory analyst selects in a list type field 1203 the type of list that is to be searched including the Grey List, the Restricted List or a combination of all of these lists. The SA also selects the security search criteria by either choosing the security name search, Bloomberg symbol search, cusip code search, isin code search, sedol code search, Reuters code search or the code name search in the search criteria field 1205 and enters into a security name field 1207 the name of a particular entity to be searched for in list database 103. In an exemplary embodiment the input into security name field 1207 may be a partial input and the search mechanism used may be a fuzzy search or any other search mechanism that provides search results based on a partial input if the exact match section 1209 is not checked—otherwise it retrieves the exact search criteria results. Reports Section 609 has reports that generate Active Grey Lists, Active Restricted Lists, Active Grey and Restricted Lists, Recent Grey Lists, Recent Restricted Lists and Recent Grey and Restricted Lists. Last Update Section 1211 displays the date and time of the latest addition of Grey or Restricted List made to the system by the Compliance Officer and is used as a reference by the supervisory analysts.

Referring now to FIG. 13, there is shown a screenshot of a supervisory analyst query response screen 1301 according to an exemplary embodiment that includes at least a portion of the Restricted List and Grey List that is responsive to an SA's query. Response 1301. For each entity included in search results section 1323, information is provided upon which the SA can determine whether the publication of a particular research report is permissible. For example, included is an issuer field 1307 that lists the name of the particular entity, a plurality of issuer ID number fields 1309 that include the ID number of the entity security that is restricted, a date field 1311 that indicates the date the entity was placed on the particular list and the date it is expected that the entity will be removed from the list and a location field 1208 that indicates the location within the financial institution from which the entry regarding the entity originated. Also included is a list field 1303, a sensitivity level field 1305, a safe harbor field 1315 that correspond to fields in research suppression section 329 of issuer detail screen 301 in which the compliance officer indicates under what circumstances an analysts report regarding the entity may be published, as described above. In an exemplary embodiment, other fields may be included such as a field displaying any comments from the compliance officer regarding the entity, the names of deal team members who are over the wall as in field 1317 and the transaction type as in field 1319. A query section 1321 is included for an easier search functionality for the users.

Referring to FIG. 14, there is shown a screenshot of a private bank query response screen 1401. In the exemplary embodiment depicted in screen 1401, the private banker is given access to all the securities that is Restricted for the private bankers by the Compliance Officers. Screen 1401 displays various fields of information for each entity including an issuer field and aka field 1403 that is the name of the entity and its alias, a date field 1405 that is the date the entity was placed on the particular list (for the given transaction) and the date the entity (for a particular transaction) is to be removed from the given list, the plurality of issuer ID number fields 1407 that include the ID number of the entity security that is restricted, the country section 1409 for that security, the name of the compliance officer who entered the deal in the section 1411, a transaction field 1413 that indicates the transaction type regarding which the financial institution is advising the entity and a Restriction field 1415 that displays the restriction on that security. In an exemplary embodiment, any other suitable information may also be displayed in results screen 701.

As with a query provided to system 101 by a trader, a query provided by an SA may include all or a part of the name of a particular entity in which case Response 1201 will include those entities that match the provided search phrase. Also, it will be obvious to provide the SA with a mechanism for searching on other fields contained in restricted file list 105 and Grey list file 107.

Typically, before an employee of a financial institution is allowed to transact in a security in the employee's personal account, the employee is required to check whether the entity issuing the security is on the financial institution's Restricted List. To make such a determination, the employee operates an employee access device (for example, a personal computer executing suitable software) that communicates with system 101 using any known communications method and protocol, such as the Internet. Employee access device interfaces with user interface 119 for sending to list manager 121 a query from the employee as to whether the contemplated transaction is prohibited based on the Restricted List contained in restricted list file 105. Based on the information contained in restricted list file 105, list manager 121 determines whether the employee transaction is permissible and forwards the response to employee access device 117 via user interface 119.

Accordingly, the present invention provides a system and method for implementing a compliance program in a geographically-dispersed financial institution. Because the financial institution's Restricted List and Grey List are centrally stored in list database 103 and accessible using any known communications method and protocol, such as the Internet, any affiliate of the financial institution, such as a trader, SA and employee, may access system 101 in order to determine whether a contemplated action is allowed based on the contents of the Restricted List and Grey List and the financial institutions compliance program. In this way, a compliance officer need not be contacted by a requesting affiliate in order to approve each contemplated transaction thereby significantly increasing the rate at which contemplated transactions are approved. Furthermore, because system 101 may structured to be globally-accessible (for example, if system 101 is connected to the Internet), information entered into system 101 by a financial institution's compliance officer located in a first time zone becomes immediately accessible by affiliates of the financial institution located in a second time zone. Thus, contemplated trades or research report publications may be approved immediately without having to directly query a responsible compliance officer that may be difficult to reach.

System 101 also includes an export interface 123 that receives list information from list database 103 via list manager 121 for export to external systems. In an exemplary embodiment, export interface 123 exports to external market data systems the entities included in the financial institution's Restricted List so that securities issued by such entities that are displayed in such market systems can be labeled as a restricted securities. An example of such an external market data system is a Bloomberg system that receives the restricted list information from export interface 123 and labels the securities it displays as restricted, where appropriate, so that affiliates of the financial institution that use the Bloomberg system can see at a glance what securities are restricted.

Export interface 123 also exports Restricted List and Grey list information to a surveillance systems that is operated by the financial institution to determine that trades performed by traders and employees of the financial institution do not violate the financial institution's compliance program. Surveillance system monitors trades executed through the financial institution's trading systems and determines whether any trades involves securities of entities that are included in the Restricted List and whether the particular trade was permissible based on the scope of the restriction associated with such entities. The surveillance system also determines whether any trades involve securities of entities that are on the Grey List and, if so, is there a trading pattern in such securities that may indicate a violation of the financial institution's compliance program. In either case, the surveillance system may also notify a compliance officer of trades and trading patterns that may be impermissible and that therefore merit further scrutiny.

Figure 15:
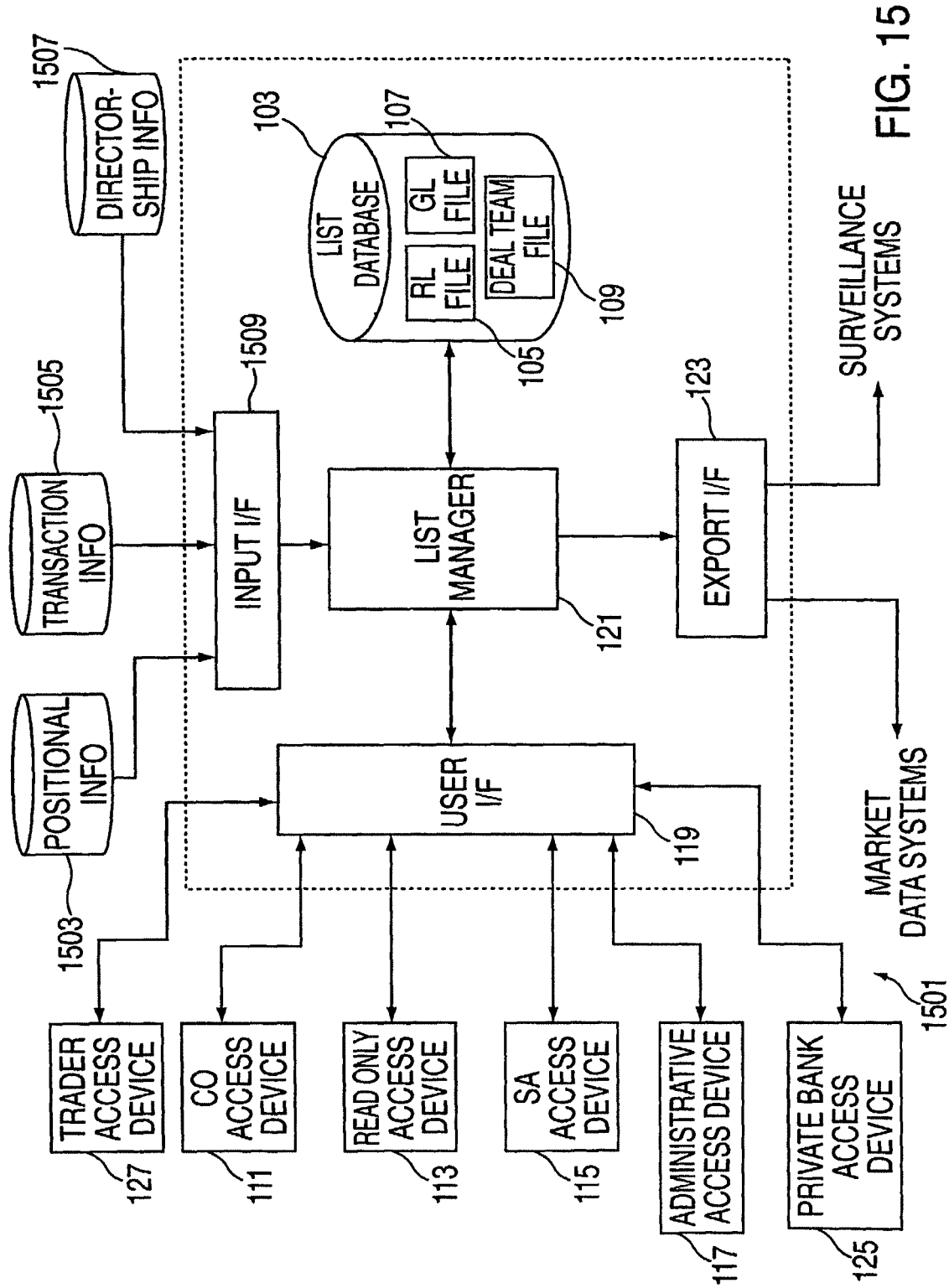
FIG. 15 is a block diagram of a global compliance system according to an exemplary embodiment of the present invention.

Referring now to FIG. 15, there is shown a block diagram of a global compliance system 1501 according to an exemplary embodiment of the present invention. Elements that are similar to elements of system 101 of FIG. 1 are identically labeled and a detailed description thereof is omitted.

System 1501 includes an input interface 1509 that receives information from three sources: a positional information source 1503, a transaction information source 1505 and a directorship information source 1507. Positional information source 1503 includes the securities in which the financial institution maintains a position that is at the financial institution's position limit for that security. Typically, positional information is derived from analyzing information from several sources including, for example, all the financial institution's trading systems and the financial institution's books and records. Once it is determined in which securities the financial institution has reached its position limits, this information is fed to system 1501 in the form of positional information source 1503. This information is then forwarded by input interface 1509 to list manager 121 that determines the entities that should be restricted based on the position limits reached by the financial institution. List manager 121 then causes such restrictions to be stored in restricted list file 105 contained in list database 103.

Transaction information source 1505 includes information regarding the transactions the financial institution's bankers are engaged in. This information may be derived from systems in that are used by the financial institution's bankers to document each ongoing transaction. Based on this information, list manager 121 determines those entities that are included in any of the transactions and that therefore should be included in either the Restricted List or Grey List and under what circumstances should trading and research publication be restricted. List manager 121 then causes such restrictions to be stored in restricted list file 105 contained in list database 103.

Directorship information source 1507 includes information regarding the directorships any financial institution affiliates maintain that may give rise to a trading/publication restriction. Based on this information, list manager 121 determines those entities that for which an affiliate holds a directorship and that therefore should be included in either the Restricted List or Grey List and under what circumstances should trading and research publication be restricted. List manager 121 then causes such restrictions to be stored in restricted list file 105 contained in list database 103.

Thus, while in system 101, a compliance officer was responsible for inputting list information into system 101, in system 1501, such information is automatically received from positional information source 1503, transaction information source 1505 and directorship information source 1507 and stored in list database 103. In addition to automatically receiving such information, a compliance officer may operate CO access device 111 to input additional compliance information or modify existing compliance information.

Figure 16:
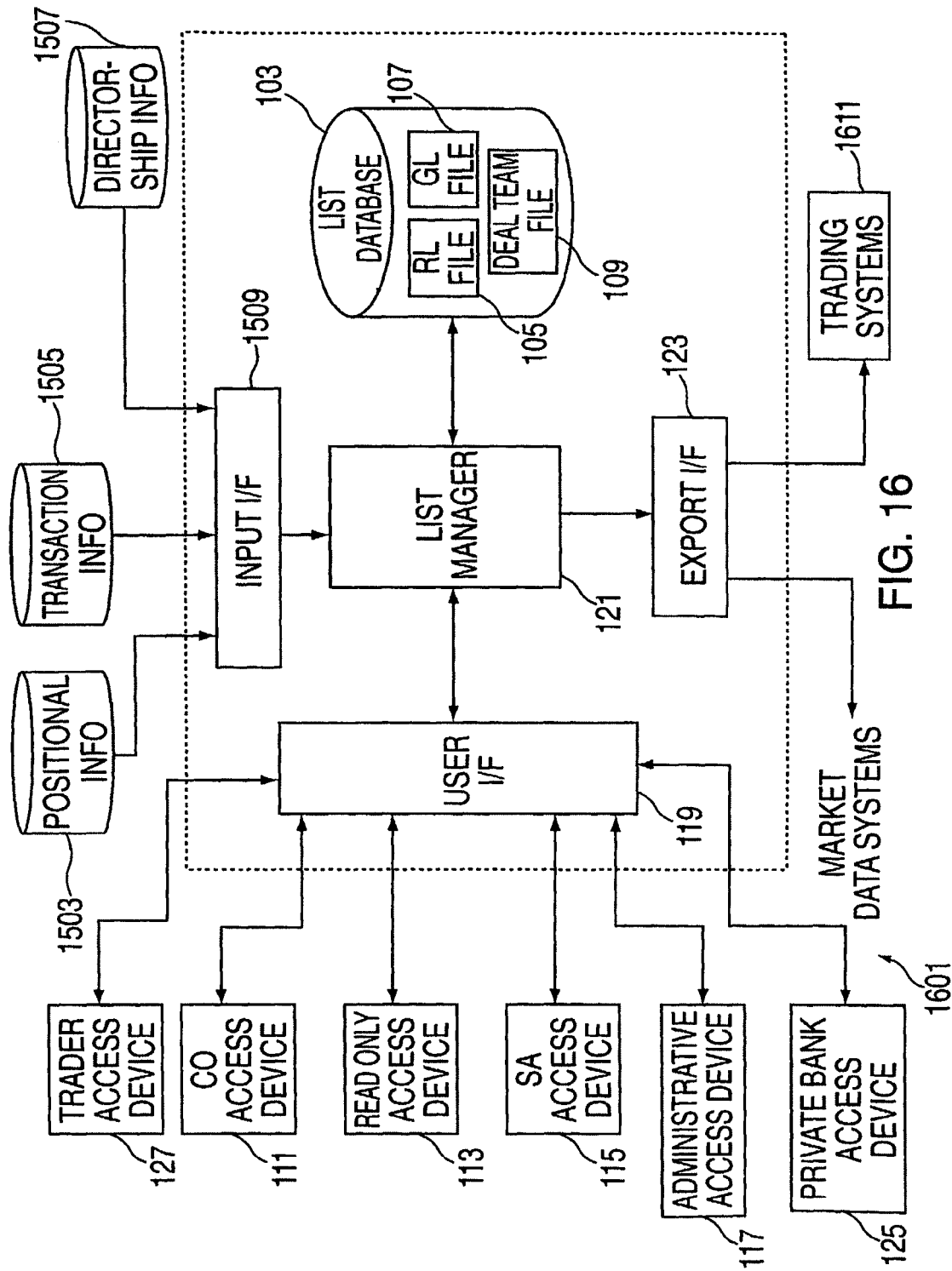
FIG. 16 is a block diagram of a global compliance system according to another exemplary embodiment of the present invention.

Referring now to FIG. 16, there is shown a block diagram of a global compliance system 1601 according to another exemplary embodiment of the present invention. Elements that are similar to elements of system 1501 of FIG. 15 are identically labeled and a detailed description thereof is omitted.

In system 1601, export interface 123 also exports Restricted List and Grey List information to the financial institution's trading system 1611. In this embodiment, trading system 1611 monitors the entities that are contained in the Restricted List and either flag or prevent trading in securities issued by such entities that violate any restrictions contained in the list. In addition, system 1601 monitors trading patterns in securities included in the Grey List to determine whether any such patterns is in violation of the financial institution's compliance program. In either case, trading system 1611 may alert a compliance officer of any such trades or trading patterns for further investigation.

Accordingly, system 1601 automates the process by which information is received for inclusion in either the Restricted List or Grey List thereby reducing any dependence on compliance officers to gather and input such information.

Figure 17:
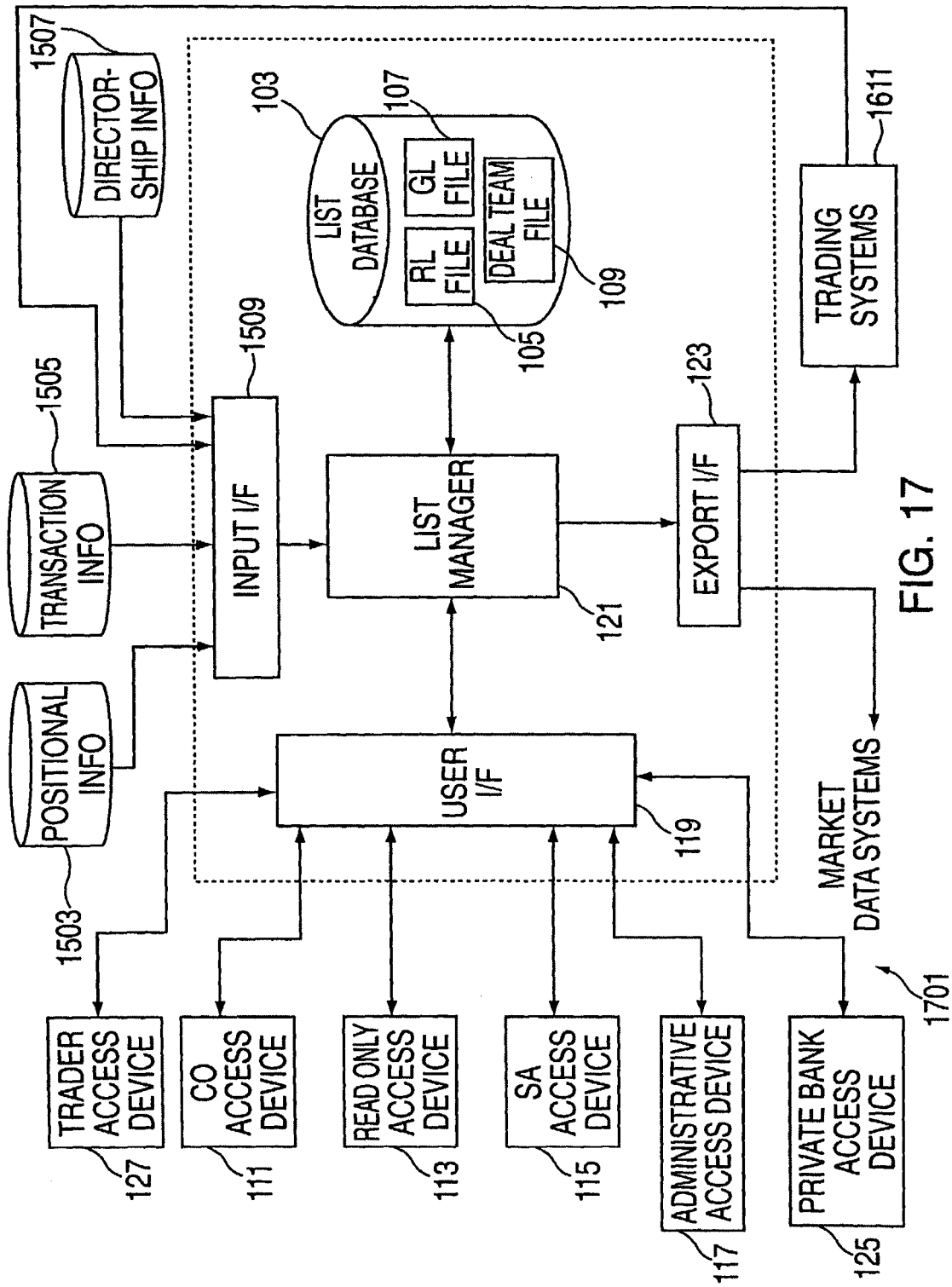
FIG. 17 is a block diagram of a global compliance system according to yet another exemplary embodiment of the present invention.

Referring now to FIG. 17, there is shown a block diagram of a global compliance system 1701 according to yet another exemplary embodiment of the present invention. Elements that are similar to elements of system 1601 of FIG. 16 are identically labeled and a detailed description thereof is omitted.

In system 1701, input interface 1509 also receives information from trading systems 1611 upon which further refinement can be made to the information contained in either the Restricted List or Grey List.

Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computerized system for implementing a compliance program in a financial institution, comprising:
   a list database for storing restricted list information regarding a plurality of entities and restrictions imposed on employees of the financial instructions in conducting activities associated with the plurality of entities, the restricted list information being partitioned into a grey list and a restricted list;
   a list manager module, executing on at least one programmable processor, retrieving and delivering at least a portion of the restricted list information from the list database to an external computer system;
   wherein the list manager module, executing on the at least one programmable processor, receives information from an automated source and further refines the restricted list information contained in the restricted list or the grey list stored in the list database based upon the information from the source.

2. The system of claim 1, wherein the source is a computer trading system and the information from the computer trading system comprises trading patterns in securities of the plurality of entities included in the restricted list information; and
   the list manager module further refines the restricted list information contained in the restricted list or grey list according to the information from the computer trading system.

3. The system of claim 1, wherein the source is a positional information source and the information from the positional information source comprises positional information that identifies securities in which the financial institution maintains a position and have reached a position limit imposed by the financial institution; and
   the list manager module further refines the restricted list information contained in the restricted list or the grey list to include additional entities determined from the positional information.

4. The system of claim 1, wherein the source is a transactional information source and the information from the transactional information source comprises transactional information that identifies entities included in transactions handled by the financial institution; and
   the list manager module further refines the restricted list information contained in the restricted list or the grey list to include additional entities determined from the transactional information.

5. The system of claim 1, wherein the source is a directorship information source and the information from the directorship information source comprises directorship information that identifies entities in which the financial institution or an affiliate of the financial institution holds a directorship status; and the list manager module further refines the restricted list information contained in the restricted list or the grey list to include additional entities determined from the directorship information.

6. The system of claim 1, further comprising an input interface module, executing on the at least one programmable processor, that receives and forwards the information from the source to the list manager module to further refine the restricted list information contained in the restricted list or the grey list.

7. The system of claim 1, wherein the external computer system is a computer access device, the list manager module delivering at least a portion of the restricted list information from the list database to the computer access device in response to a query from the computer access device regarding whether a particular entity is included in the restricted list information.

8. The system of claim 1, wherein the external computer system is a computer surveillance system, the list manager module delivering at least a portion of the restricted list information from the list database to the computer surveillance system, the restricted list information being used by the computer surveillance system to monitor and issue alerts in response to trades executed through the computer trading system in securities of one or more of the plurality of entities included in the restricted list information.

9. The system of claim 1, wherein the external computer system is the computer trading system executing on at least one programmable processor, the list manager module delivering at least a portion of the restricted list information from the list database to the computer trading system, the information being used by the computer trading system to monitor and flag or prevent trading in securities of one or more of the plurality of entities included in the restricted list information.

10. A computer program product, tangibly embodied in an computer readable storage device, for implementing a compliance program in a financial institution, including instructions being operable to cause data processing apparatus to:
  store, in a list database, restricted list information regarding a plurality of entities and restrictions imposed on employees of the financial instructions in conducting activities associated with the plurality of entities, the restricted list information being partitioned into a grey list and a restricted list;
  retrieve and deliver at least a portion of the restricted list information from the list database to an external computer system;
  receive information from an automated source and further refine the restricted list information contained in the restricted list or the grey list stored in the list database based upon the information from the source.

11. The computer program product of claim 10, wherein the source is a computer trading system and the information from the computer trading system comprises trading patterns in securities of the plurality of entities included in the restricted list information; and
  the computer program product including further instructions to further refine the restricted list information contained in the restricted list or grey list according to the information from the computer trading system.

12. The computer program product of claim 10, wherein the source is a positional information source and the information from the positional information source comprises positional information that identifies securities in which the financial institution maintains a position and have reached a position limit imposed by the financial institution; and
  the computer program product including further instructions to further refine the restricted list information contained in the restricted list or the grey list to include additional entities determined from the positional information.

13. The computer program product of claim 10, wherein the source is a transactional information source and the information from the transactional information source comprises transactional information that identifies entities included in transactions handled by the financial institution; and
  the computer program product including further instructions to further refine the restricted list information contained in the restricted list or the grey list to include additional entities determined from the transactional information.

14. The computer program product of claim 10, wherein the source is a directorship information source and the information from the directorship information source comprises directorship information that identifies entities in which the financial institution or an affiliate of the financial institution holds a directorship status; and
  the computer program product including further instructions to further refine the restricted list information contained in the restricted list or the grey list to include additional entities determined from the directorship information.

15. A computerized method for implementing a compliance program in a financial institution, comprising:
  storing in a list database, by at least one programmable processor, restricted list information regarding a plurality of entities and restrictions imposed on employees of the financial instructions in conducting activities associated with the plurality of entities, the restricted list information being partitioned into a grey list and a restricted list;
  retrieving and delivering, by the at least one programmable processor, at least a portion of the restricted list information from the list database to an external computer system;
  receiving information from an automated source and further refining the restricted list information contained in the restricted list or grey list stored in the list database based upon the information from the source by the at least one programmable processor.

16. The computer program product of claim 15, wherein the source is a computer trading system and the information from the computer trading system comprises trading patterns in securities of the plurality of entities included in the restricted list information; and the method further comprising:
  further refining, by the at least one programmable processor, the restricted list information contained in the restricted list or grey list according to the information from the computer trading system.

17. The computer program product of claim 15, wherein the source is a positional information source and the information from the positional information source comprises positional information that identifies securities in which the financial institution maintains a position and have reached a position limit imposed by the financial institution; and the method further comprising:
  further refining, by the at least one programmable processor, the restricted list information contained in the restricted list or grey list to include additional entities determined from the positional information.

18. The method of claim 15, wherein the source is a transactional information source and the information from the transactional information source comprises transactional information that identifies entities included in transactions handled by the financial institution; and the method further comprising:

further refining, by the at least one programmable processor, the restricted list information contained in the restricted list or grey list to include additional entities determined from the transactional information.

19. The method of claim 15, wherein the source is a directorship information source and the information from the directorship information source comprises directorship information that identifies entities in which the financial institution or an affiliate of the financial institution holds a directorship status; and the method further comprising:

further refining, by the at least one programmable processor, the restricted list information contained in the restricted list or grey list to include additional entities determined from the directorship information.

* * * * *